United States Patent
Bondugula et al.

(10) Patent No.: US 11,425,144 B2
(45) Date of Patent: Aug. 23, 2022

(54) CONTROLLING ACCESS TO MULTI-GRANULARITY DATA

(71) Applicant: EQUIFAX INC., Atlanta, GA (US)

(72) Inventors: Rajkumar Bondugula, Atlanta, GA (US); Christopher Yasko, Atlanta, GA (US)

(73) Assignee: EQUIFAX INC., Atlanta, GA (US)

( * ) Notice: Subject to any disclaimer, the term of this patent is extended or adjusted under 35 U.S.C. 154(b) by 0 days.

(21) Appl. No.: 16/652,309

(22) PCT Filed: Sep. 24, 2019

(86) PCT No.: PCT/US2019/052655
§ 371 (c)(1),
(2) Date: Mar. 30, 2020

(87) PCT Pub. No.: WO2020/072239
PCT Pub. Date: Apr. 9, 2020

(65) Prior Publication Data
US 2021/0234869 A1    Jul. 29, 2021

Related U.S. Application Data

(62) Division of application No. 16/414,504, filed on May 16, 2019.
(Continued)

(51) Int. Cl.
*H04L 9/40* (2022.01)
*G06F 21/62* (2013.01)

(52) U.S. Cl.
CPC ........ *H04L 63/108* (2013.01); *G06F 21/6227* (2013.01); *H04L 63/205* (2013.01)

(58) Field of Classification Search
CPC . H04L 63/108; H04L 63/205; H04L 63/0407; H04L 63/0254; H04L 63/0245;
(Continued)

(56) References Cited

U.S. PATENT DOCUMENTS

| 5,724,556 A | 3/1998 | Souder et al. |
| 9,785,786 B2 * | 10/2017 | Mattsson ............ G06F 21/6227 |

(Continued)

FOREIGN PATENT DOCUMENTS

| CN | 103810441 A | 5/2014 |
| JP | 2015125646 A | 7/2015 |

OTHER PUBLICATIONS

PCT/US2019/052655, "International Search Report and Written Opinion", dated Jan. 17, 2020, 9 pages.
(Continued)

*Primary Examiner* — Carl G Colin
*Assistant Examiner* — Andrew Suh
(74) *Attorney, Agent, or Firm* — Kilpatrick Townsend & Stockton LLP

(57) ABSTRACT

According to certain implementations, a permissions gateway receives an access request indicating multiple sets of secured data that include high-granularity data stored on multiple secured data repositories. The access request is compared to a permission set with multiple consent parameters, which indicate access types for the secured data. Based on a comparison of the access request to a permission set, the permissions gateway queries, the permission gateway queries a first data repository for a high-granularity dataset that includes a portion of the high-granularity data, and queries a second data repository for a low-granularity dataset that includes a summary of part of the high-granularity data. The permissions gateway generates a multi-granularity response to the access request, based on a combination of the high-granularity dataset and the low-granularity dataset.

20 Claims, 5 Drawing Sheets

Related U.S. Application Data

(60) Provisional application No. 62/740,650, filed on Oct. 3, 2018, provisional application No. 62/740,650, filed on Oct. 3, 2018, provisional application No. 62/672,189, filed on May 16, 2018.

(58) Field of Classification Search
CPC ......... G06F 21/6227; G06F 2221/2111; G06F 21/6245
See application file for complete search history.

(56) References Cited

U.S. PATENT DOCUMENTS

| | | |
|---|---|---|
| 10,311,522 B1 | 6/2019 | Jin et al. |
| 2003/0167401 A1 | 9/2003 | Murren et al. |
| 2007/0027810 A1 | 2/2007 | Longnecker et al. |
| 2007/0244987 A1 | 10/2007 | Pedersen et al. |
| 2011/0231443 A1 | 9/2011 | Hannel et al. |
| 2011/0265162 A1* | 10/2011 | Alavandar ............ G06Q 99/00 726/7 |
| 2012/0192247 A1* | 7/2012 | Oliver ................ G06F 21/6245 726/1 |
| 2013/0031364 A1 | 1/2013 | Glew et al. |
| 2013/0054363 A1* | 2/2013 | Sasankan ........... G06Q 30/0259 705/14.54 |
| 2014/0090081 A1 | 3/2014 | Mattsson et al. |
| 2014/0201126 A1 | 7/2014 | Zadeh et al. |
| 2017/0187730 A1* | 6/2017 | Singla ................ H04L 63/1416 |
| 2019/0166115 A1 | 5/2019 | Manza et al. |
| 2019/0172564 A1* | 6/2019 | Chandra ........... G06F 16/24522 |

OTHER PUBLICATIONS

International Patent Application No. PCT/US2019/052655, "International Preliminary Report on Patentability", dated Apr. 15, 2021, 6 pages.
U.S. Appl. No. 16/414,504, "Non-Final Office Action", dated Oct. 22, 2021, 26 pages.
U.S. Appl. No. 16/414,504, "Notice of Allowance", dated Apr. 8, 2022, 9 pages.
EP19869336.8, "Extended European Search Report", dated May 30, 2022, 6 pages.

* cited by examiner

CONTROLLING ACCESS TO MULTI-GRANULARITY DATA

RELATED APPLICATIONS

The present disclosure claims priority to U.S. provisional application Ser. No. 62/740,650 for "Controlling Access to Multi-Granularity Data," filed Oct. 3, 2018, which is incorporated by reference herein in its entirety.

TECHNICAL FIELD

This disclosure relates generally to the field of data security, and more specifically relates to controlling access by computing devices to sensitive or other protected data.

BACKGROUND

Certain types of secured data (e.g., personally identifiable information ("PII"), medical information, financial information) are stored on secured data repositories that selectively allow or deny access to the secured data by client devices over a network. The secured data may include high-granularity data, such as a high-granularity dataset that includes a large number of records. For example, the high-granularity data may describe a quantity of events during a period of time.

In some cases, secured data may be accessible via an intermediary, such as a computing system that provides a representation of the secured data. The intermediary system may provide a low-granularity representation of the secured data, such as a dataset or data object that summarizes the large number of individual records in the high-density dataset. For example, the low-granularity representation may include a numeric score that summarizes the high-density dataset.

A conventional intermediary system may be unable to select types of access to the secured data. For example, the conventional intermediary system may allow access to low-granularity representations of the secured data. In addition, the conventional intermediary system may be unable to permit access to high-granularity representations of the secured data. Thus, a conventional intermediary system may be unable to determine permissions for various types of access.

SUMMARY

According to certain implementations, a permissions gateway receives, from a requesting system, an access request. The access request indicates multiple sets of secured data that are stored on respective secured data repositories. Each of the sets of secured data includes high-granularity data describing electronic transactions performed in a computing environment. The permissions gateway compares the access request to a permission set that includes a first consent parameter and a second consent parameter. The first consent parameter indicates a first access type for the secured data, and the second consent parameter indicates a second access type for the secured data. Based on the comparison of the access request to the permission set, the permissions gateway queries a first secured data repository and also queries a second secured data repository. The query to the first secured data repository is for a high-granularity dataset that includes a portion of the high-granularity data stored on the first secured data repository. The query to the second secured data repository is for a low-granularity dataset that includes a summary of the high-granularity data stored on the second secured data repository. Responsive to the querying, the permissions gateway receives the high-granularity dataset from the first secured data repository and the low-granularity dataset from the second data repository. The permissions gateway generates a multi-granularity response to the access request, the multi-granularity response based on a combination of the high-granularity dataset and the low-granularity dataset. The permissions gateway provides the multi-granularity response to the requesting system.

These illustrative aspects are mentioned not to limit or define the disclosure, but to provide examples to aid understanding thereof. Additional aspects are discussed in the Detailed Description, and further description is provided there.

BRIEF DESCRIPTION OF THE DRAWINGS

Features, implementations, and advantages of the present disclosure are better understood when the following Detailed Description is read with reference to the accompanying drawings, where.

DETAILED DESCRIPTION

Figure 1:
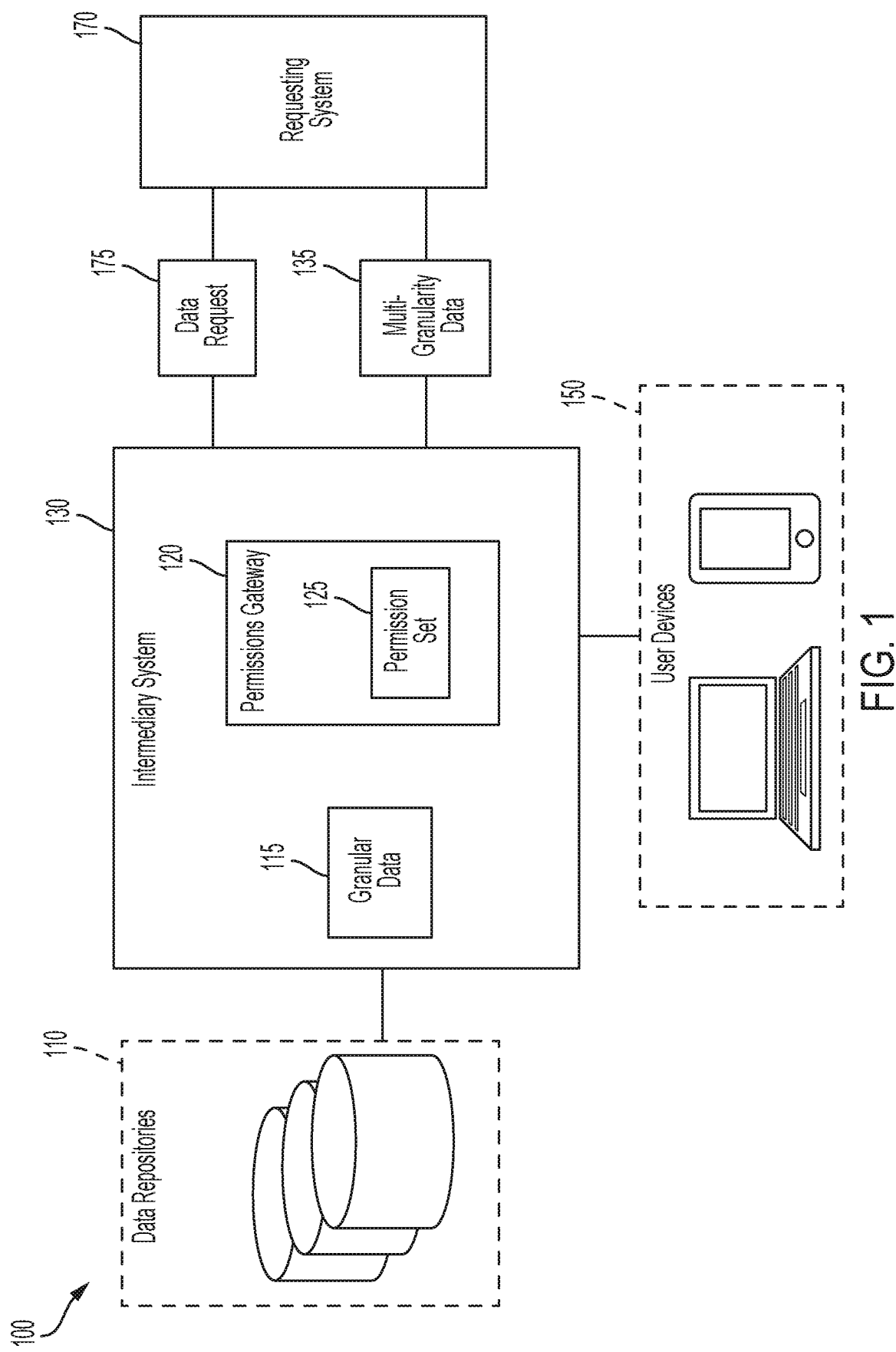
FIG. 1 is a block diagram depicting an example of a computing system for controlling access to secured data, according to certain implementations.

As discussed above, prior techniques for controlling access to secured data may not provide for permissions indicating access types for the secured data. Certain aspects described herein involve generating permission sets that indicate an access type, such as an access type including a high-granularity or low-granularity representation of secured data. In addition, a permission set may indicate attributes of computing systems that are capable of requesting access to secured data. The permission set may be based on consent parameters, such as consent parameters describing a type of access request, a window of time, a geographical location, or a communication medium (e.g., mobile device, desktop computer, paper mail).

In some cases, the high-granularity or low-granularity representations of the secured data may represent the secured data at different levels of detail. For example, a high-granularity representation may include a relatively large quantity of data, such as several thousand records from a database. In addition, a low-granularity representation may include a relatively small quantity of data, such as a dozen records from a database. In some cases, the low-granularity representation includes a single number or text item that summarizes the secured data.

A computing system that requests access to secured data may receive a high-granularity or a low-granularity representation of the secured data, based on a comparison of attributes of the requesting system to consent parameters indicated by the permission set. In addition, a multi-granularity response may be generated based on a combination of the high-granularity and low-granularity representations. The multi-granularity response may include data at multiple levels of detail (e.g., high detail, low detail). In some cases, the multi-granularity response may be provided to the requesting computer system in response to the access request.

In a conventional intermediary system, a user may be unable to control access to his or her secured data. For example, in a conventional intermediary system, the intermediary system may be unable to control types of access to the secured data based on a permission set, such as a permission set with consent parameters describing a location, a window of time, a communication channel (such as a mobile device or desktop computer), a purpose for the access, or other suitable parameters. In addition, in a conventional intermediary system, the intermediary system may be unable to permit types of access to the secured data, such as access to high- or low-granularity data by a computing system to provide a service desired by a user. Aspects described herein provide for generation and modification of permission sets that indicate allowed (or denied) access types. A permissions gateway that is capable of controlling certain types of access to secured data may beneficially provide data access to requesting systems that comply with indicated parameters, or deny access to requesting systems that do not comply with the indicated parameters. In addition, a permission set may be modifiable via a user device that is capable of communicating with the permissions gateway. The modifiable permission set may provide flexibility and greater control to a user who may desire to update types of permitted access to his or her secured data. In some cases, the permission set may provide improved security for a user who may desire to increase (or decrease) fraud sensitivity regarding his or her secured data. For example, the permission set may include one or more parameters describing a level of sensitivity to potentially fraudulent requests to access the secured data. Based on the sensitivity parameters, the permissions gateway may allow (or deny) access to the secured data, for a requesting system that complies (or does not comply) with the sensitivity parameters.

In some aspects, a permission set may indicate a type of access that is provided by the intermediary system. For example, the permission set may include consent parameters indicating access to highly detailed data, or access to data at a low level of detail. The consent parameters may indicate access types that are associated with characteristics of a requesting system. For example, the permissions gateway may allow access to a requesting system that includes the characteristics indicated by the consent parameters. The consent parameters may control the type of access granted to different requesting systems. In one example, the consent parameters can allow a requesting system having certain attributes to access a high-granularity representation of secured data. In another example, the consent parameters may allow a different requesting system having other attributes to access a low-granularity representation of secured data. A first example requesting system, such as for a grocer specializing in international foods, may have first characteristics of "food services," "medium customer reviews," and "located in zip code 12345." Based on the first characteristics, the first requesting system may be allowed to access low-granularity data indicating "vegetarian cuisine preference," "female gender," and "located in zip code 12346." A second example requesting system, such as for a medical practice specializing in dietary and nutrition services, may have second characteristics of "medical services," "well-rated by customer reviews" and "located in zip code 12345." Based on the second characteristics, the second requesting system may be allowed to access high-granularity data indicating "vegetarian cuisine preference," "female gender," "located in zip code 12346," "diabetic medical condition," "age range of 35-45 years," "income range of $100,000-200,000," and "college-level education." In some cases, a particular requesting system having particular characteristics may be prevented from accessing any of the secured data.

In some aspects, the intermediary system can generate a response based on the consent parameters. For example, the intermediary system may generate a response that is based on a high-granularity dataset that is permitted by a relatively open consent parameter. The intermediary system may generate a different response based on a low-granularity dataset that is permitted by a relatively restrictive consent parameter. In addition, the intermediary system may generate a multi-granularity response that is based on datasets at multiple levels of detail. As a non-limiting example, if a particular requesting system is allowed to access a first dataset in high detail, such as daily electronic transactions of a first credit account, and is allowed to access a second dataset in low detail, such as a credit score of a second credit account, the intermediary system may generate a multi-granularity response that includes a risk assessment based on analysis of individual data records of the first dataset and a summary (e.g., without individual data records) of the second dataset.

Referring now to the drawings, FIG. 1 is a block diagram depicting an example of a computing system 100 in which access to secured data is controlled. The secured data may include one or more categories of PII that are related to an end user. For example, the secured data may include PII that describes a person's name, address, social security number, or other identifying information. In addition, the secured data may include PII that describes the person's employment history, nationality, ethnic heritage, religious affiliation, medical history, genetic makeup, financial information, educational history, personal preferences, or other personal characteristics. The secured data may include information that is considered protected, such as any type of information that is protected against unpermitted disclosure by a law, a contractual term, or other agreement.

In the computing system 100, one or more data repositories, such as data repositories 110, may include secured data. In some cases, the data repositories 110 may be operated by an entity that also operates one or more of the intermediary system 130 or the requesting system 170. In addition, the data repositories 110 may be operated by one or more additional entities, such as businesses or government organizations. Each of the data repositories 110 may include a respective portion of the secured data that is stored at a level of granularity. In some aspects, high-granularity data may include more detail than low-granularity data. For example, high-granularity data describing a person's genetic makeup may include more detail regarding the person's familial ancestry than low-granularity data describing the person's ethnic category. In addition, high-granularity data describing daily transactions of a person's credit card may include more detail regarding the person's financial choices than low-granularity data describing the closing balance of the person's monthly credit card statement. In some cases, high-granularity data may be considered more sensitive (e.g., includes a higher level of personal detail) as compared to low-granularity data.

In the computing system 100, access to the secured data may be controlled by an intermediary system 130. For example, the intermediary system 130 may receive a request to access some or all of the secured data, such as a data request 175 received from a requestor system 170. In some cases, the data request 175 may be received via an application programming interface ("API"), a database call, or any other suitable request technique. The data request 175 may be analyzed by the intermediary system 130. Based on the analysis, the intermediary system 130 may receive granular data 115. The granular data 115 may include secured data from one or more of the data repositories 110. In addition, the granular data 115 may include one or more portions of high-granularity data, low-granularity data, or any combination thereof.

In some aspects, the intermediary system 130 may generate a set of multi-granularity data 135 based on the granular data 115. For example, the intermediary system 130 may modify the granular data 115, such as by anonymizing personal information included in the granular data 115. In addition, the intermediary system 130 may generate a summary of the granular data 115, such as a risk assessment or a recommendation based on the granular data 115. In some cases, the intermediary system 130 may generate a response indicating that no data access is allowed in response to the data request 175. A response to the data request 175, including the multi-granularity data 135, may be provided to the requesting system 170, such as via an API, a database response, or any other suitable response technique.

In some cases, the intermediary system 130 may generate the multi-granularity data 135 based on one or more permission criteria, such as criteria set by a person associated with a portion of the secured data in the data repositories 110. In some cases, the person may be a user who is authorized to access and/or modify the permission criteria via a permissions gateway. For example, the intermediary system 130 may include a permissions gateway 120. In addition, the permissions gateway 120 (or the intermediary system 130) may include one or more permission sets, such as permission set 125. The permission set 125 may be associated with a particular person associated with a portion of the secured data, such as a person who is described by personal information included in the secured data. The person may modify the permission set 125, for example, to include one or more consent parameters that each indicates circumstances in which the person allows his or her personal information to be accessed. For example, the person may modify the permission set 125 to indicate that the intermediary system 130 is permitted to provide low-granularity data only in response to data requests. Additionally or alternatively, the person may modify the permission set 125 to indicate that the intermediary system 130 is permitted to provide anonymized data in response to data requests. Furthermore, the person may modify the permission set 125 to indicate that access to his or her personal data is not allowed. In some cases, controlling access to the high-granularity data, such as by preventing access or allowing access to only a low-granularity summary of the sensitive data, may improve security of the secured data by reducing inappropriate requests to access the data. In addition, controlling access requests based on permission criteria may improve a level of control that a person has over his or her sensitive data, such as by preventing access by entities that do not meet the permission criteria of the person.

In some aspects, the permission set 125 may be modified via one or more user devices, such as the user devices 150. For example, a user interface presented via a user device 150 may include one or more controls associated with modifications to the permission set 125. The one or more controls may allow selection of one or more of the consent parameters included in the permission set 125. In addition, the control selections received by the user interface may be received by the intermediary system 130, such as via an API. The permissions gateway 120 (or the intermediary system 130) may modify the permission set 125 based on information received from the one or more user devices 150, such as via the API. Examples of user interfaces include, without limitation, a web page (e.g., accessible via a web browser), an application, a voice-activated interface, or any other suitable user interface. Examples of user devices may include, without limitation, personal computers, laptop computers, tablet computing devices, personal mobile devices (e.g., smartphone), personal wearable devices (e.g., fitness monitor), voice-activated personal assistants, or any other suitable user device.

In addition, the permission set 125 may be modified via one or more of the intermediary system 130 or the permissions gateway 120. For example, the permissions gateway 120 may include one or more modification modules (e.g., software routines, applications, linked computing systems) capable of determining a modification to the permission set 125. In some cases, the modification may be determined based on input to a user interface, such as a user interfaced presented via one or more of the user devices 150. In addition, the modification may be determined based on a time frame, such as an expiration date or an active membership to a service. Also, the modification may be determined based on activity by the particular person associated with the secured data. As a non-limiting example, based on recent purchases of infant formula by the particular person, the permission set 125 may be modified to indicate a preference for products and services related to newborns.

In some aspects, an intermediary system may request a type of access to secured data based on permissions information, such as a permission set included in a permissions gateway. For example, based on the permission set, the permissions gateway may request a high-detail level of access, such as access to high-granularity data. In addition, the permissions gateway may request a low-detail level of access, such as access to low-granularity data, based on the permission set. In some cases, the type of access requested by the permissions gateway, including an access type having a level of detail, may be based on one or more consent parameters included in the permission set.

Figure 2:
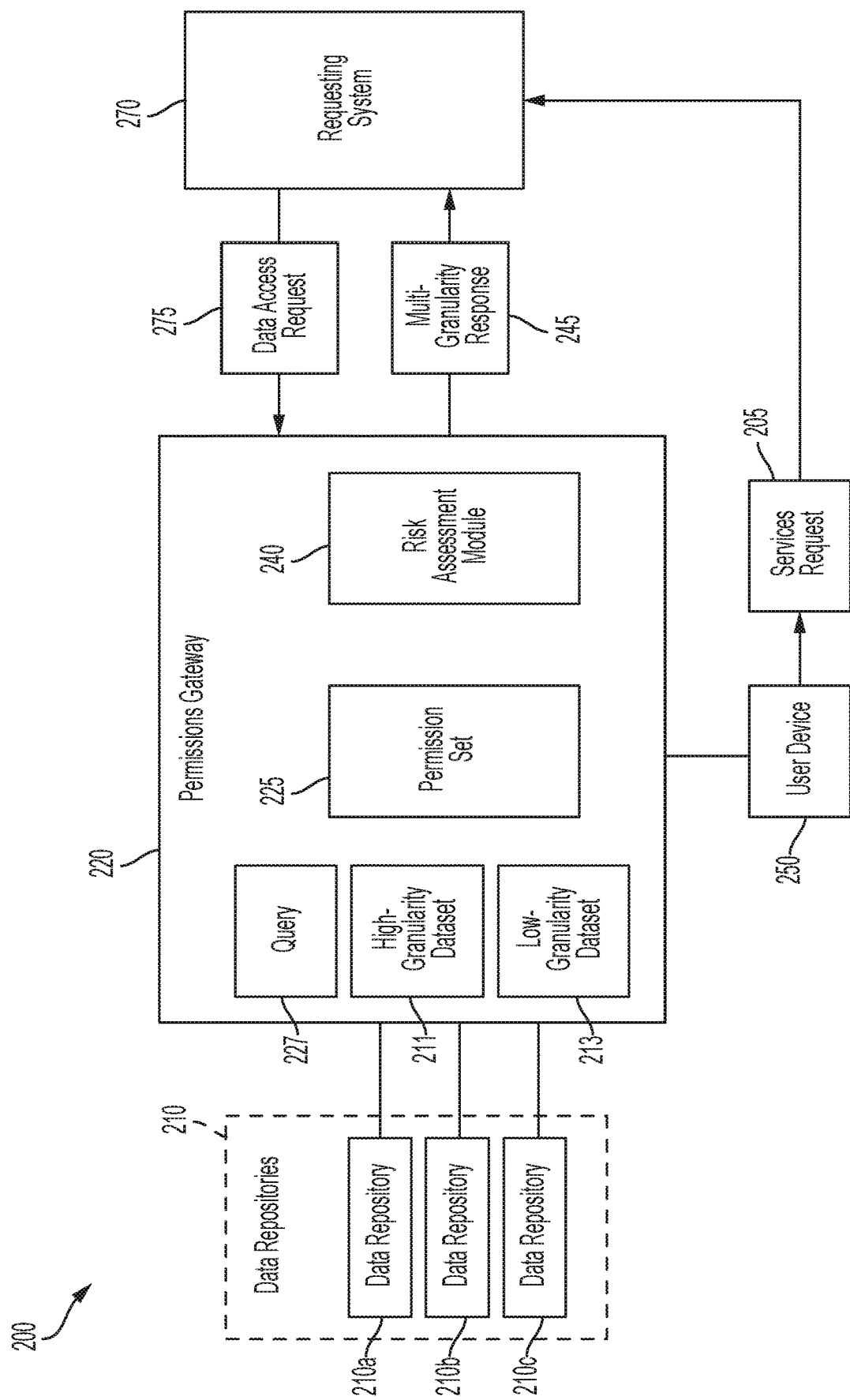
FIG. 2 is a block diagram depicting an example of a computing system including a permissions gateway, in which access to secured data is controlled based on access types, according to certain implementations.

FIG. 2 includes a block diagram depicting an example of a computing system 200 capable of controlling access to secured data based on indicated access types. The computing system 200 may include a permissions gateway 220, such as a permissions gateway included in an intermediary system as described in regards to FIG. 1. In addition, the computing system 200 may include (or communicate with) one or more data repositories, such as a data repository 210a, data repository 210b, and data repository 210c, collectively referred to herein as data repositories 210. Furthermore, the computing system 200 may include (or communicate with) one or more requesting systems, such as a requesting system 270, or user devices, such as a user device 250.

In some aspects, the permissions gateway 220 may control access to secured data stored by the data repositories 210. The access may be controlled based on one or more access types. For example, each of the data repositories 210a, 210b, and 210c may include high-granularity secured data, or low-granularity secured data, or any combination of these. Some or all of the secured data may be associated with a particular user of the computing system 200, such as a person described by the secured data. In addition, the permissions gateway 220 includes (or is otherwise capable of accessing) a permission set 225. The permission set 225 may be associated with the particular user. For example, the user may modify the permission set 225 via a user device 250, such as to indicate access types that are allowed or not allowed. In some cases, access to secured data may be regulated, such as by contractual obligations, government laws or treaties, or other binding requirements.

In some aspects, the permissions gateway 220 may be capable of requesting a portion of the secured data from the data repositories 210. The request may be described in a querying language suitable for requesting information from a database or other data storage format. For example, the permissions gateway 220 may query the data repositories 210 for a portion of the secured data. In some cases, the query or queries may indicate that the secured data is requested at a particular level of detail, such as requesting to access the data at a higher or lower level of detail. In addition, the query may indicate that multiple portions of the secured data are requested at respective levels of detail. For example, permissions gateway 220 may request a first portion of the secured data at a higher level of detail, and request a second portion of the secured data at a lower level of detail. In some cases, the level of detail described by the request is based on an access type indicated by the permission set 225.

In an example configuration of the computing system 200, the requesting system 270 may receive a request for services, such as a service request 205. The service request 205 may indicate one or more services that the requesting system is capable of providing, such as information services, analysis services, or any other suitable service. In addition, the services request 205 may be received from a computing device, such as the user device 250. The requesting system 270 may determine, based on the services request 205, one or more portions of secured data related to the requested services. In addition, the requesting system 270 may generate a data access request 275 indicating the portions of the secured data related to the requested services, such as secured data related to a user of the user device 250. The data access request 275 may be provided to the permissions gateway 220, or to an intermediary system accessible by the permissions gateway 220.

Continuing with the example configuration, the permissions gateway 220 may analyze the data access request 275. In some cases, the access request 275 is analyzed based on the permission set 225. For example, the permissions gateway 220 may compare information included in the access request 275, such as an indication of the requested secured data, with one or more consent parameters included in the permission set 225. The consent parameters may indicate criteria by which the requested data portions may be accessed, and/or a permitted access type. For example, a first consent parameter may indicate that requesting systems having a first characteristic are allowed to access a first portion of the secured data at a high level of detail. In addition, a second consent parameter may indicate that requesting systems having the second characteristic are allowed to access a second portion of the secured data at a low level of detail. In some aspects, the consent parameters are modified via the user device 250.

Based on the analysis, the permissions gateway 220 may determine that the requesting system 270 has the first characteristic and the second characteristic. In addition, the permissions gateway 220 may determine that the requesting system 270 is permitted to access the first portion of the secured data at the high level of detail and the second portion of the secured data at the low level of detail. In some cases, the permissions gateway 220 may generate a query 227 based on the comparison of the access request 275 and the permission set 225. For example, the query 227 may include a request for a high-granularity dataset from the first portion of the secured data and a request for a low-granularity dataset from the second portion of the secured data.

In some cases, the permissions gateway 220 may request a modification of the permission set 225. For example, the permissions gateway 220 may determine that the requesting system 270 has a third characteristic. In addition, the permissions gateway 220 may determine that the permission set 225 does not include a third consent parameter related to the third characteristic. The permissions gateway 220 may provide, to the user device 250, data indicating that a requesting system with the third characteristic has requested access to secured data related to the user device 250. In addition, the permissions gateway 220 may request a modification to the third consent parameter. The permission set 225 may be updated based on a response to the modification request, such as an update to the third consent parameter, indicating whether requesting systems having the third characteristic may or may not access the secured data.

Continuing with the example configuration, the query 227 is received by one or more of the data repositories 210. In addition, each of the data repositories 210 may provide a respective dataset based on the query 227. For example, responsive to the query 227, the data repository 210a may select a high-granularity dataset 211, based on the first portion of secured data at the high level of detail. In addition, the data repository 210b may select a low-granularity dataset 213, based on the second portion of secured data at the low level of detail. In some cases, one or more of the data repositories 210 may provide no data in response to the query 227, or a response that does not include any of the secured data. For example, the data repository 210c may determine that the query 227 does not request any secured data that is stored by the data repository 210c. In addition, responsive to determining that the query 227 lacks security or verification data related to the data repository 210c, the data repository 210c may provide a negative response to the permissions gateway 220.

In some aspects, the permissions gateway 220 may receive one or more of the high-granularity dataset 211 or the low-granularity dataset 213. In addition, the permissions gateway 220 may generate a response to the data access request 275, based on the data received from the data repositories 210. For example, the permissions gateway 220 may generate a multi-granularity response 245, based on a combination of, at least, the high-granularity dataset 211 and the low-granularity dataset 213. In addition, the permissions gateway 220 may provide the multi-granularity response 245 to, for example, the requesting system 270.

In some cases, the multi-granularity response 245 is based on a transformation of the received data. For example, the permissions gateway 220 may anonymize the data included in the datasets 211 and 213, and generate the multi-granularity response 245 based on the anonymized data. In some cases, transformations of the received data may be based on the permission set 225, such as a consent parameter indicating that accessed data is to be anonymized. In some cases, the multi-granularity response 245 is based on analysis of the received data. For example, the permissions gateway 220 may include a risk assessment module 240 that is capable of generating risk assessments based on the high-granularity dataset 211 and the low-granularity dataset 213. The risk assessment module 240 may determine, for example, a risk corresponding to a user associated with the datasets 211 and 213, such as a risk indicating a percentage of service failures associated with users associated with similar secured data. FIG. 2 depicts the permissions gateway 220 as including the risk assessment module 240, but other configurations are possible. For example, the risk assessment module may be included in an additional computing system, with which the computing system 200 is configured to communicate. In addition, the permissions gateway 220 may include (or otherwise access) a recommendation module that is configured to provide recommendations for a user associated with the permission set 225. The recommendation module may determine, for example, one or more products or services to recommend to the user, based on analysis of the datasets 211 and 213.

In some aspects, an access type for a data request may be determined based on a combination of consent parameters. In addition, the combination of consent parameters may indicate one or more characteristics for a requesting system. In some cases, an access type for the requesting system is determined based on the combination of parameters. For example, a first combination of consent parameters may indicate that a requesting system having the indicated characteristics is allowed to access secured data at a high level of detail. In addition, a second combination of consent parameters may indicate that a requesting system having the indicated characteristics is allowed to access secured data at a low level of detail. In some cases, access to secured data is prohibited based on a characteristic indicated by a consent parameter.

Figure 3:
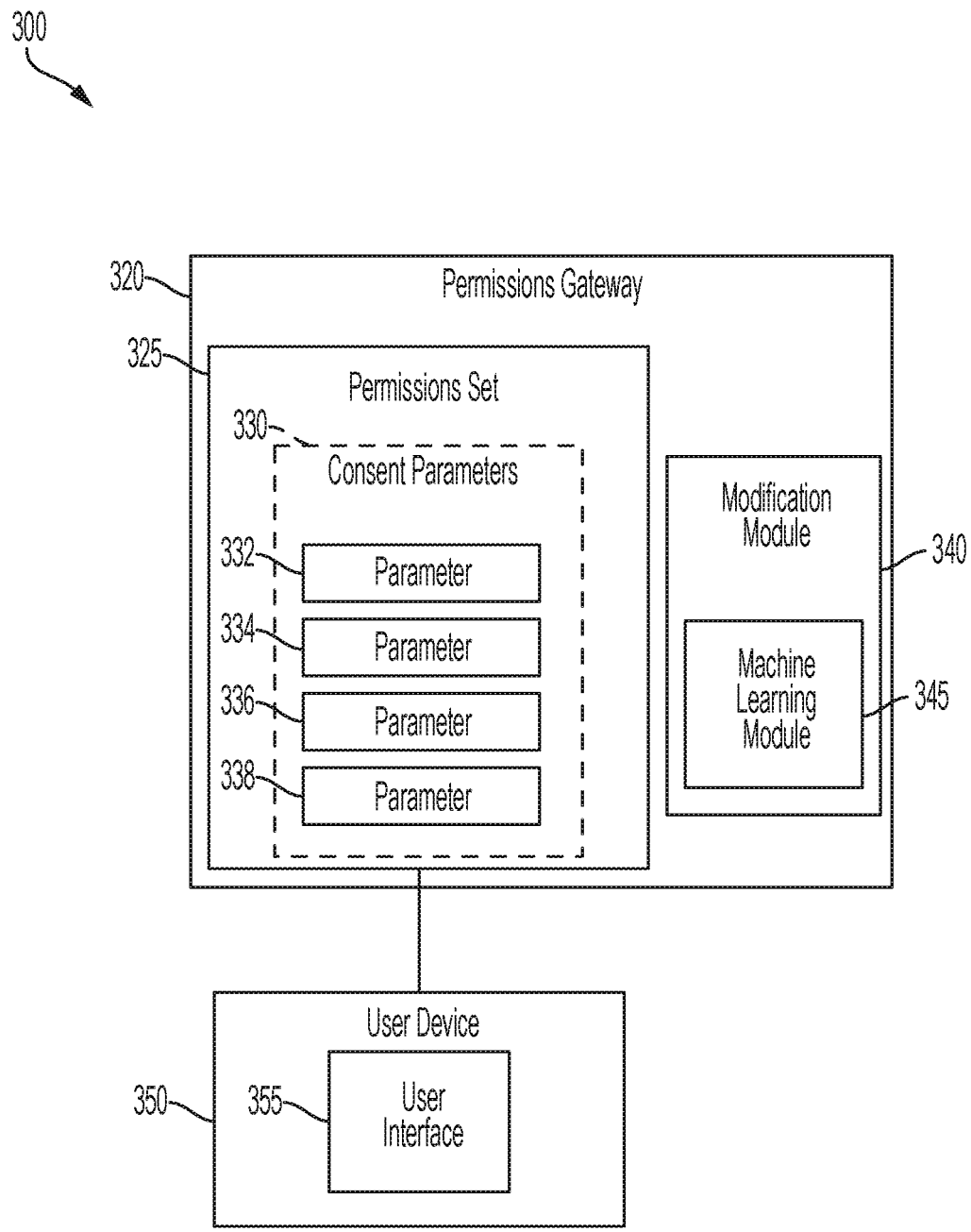
FIG. 3 is a block diagram depicting an example of a computing system in which a permission set may be modified, according to certain implementations.

FIG. 3 includes a block diagram depicting an example of a computing system 300 in which a permission set 325 may be modified. In some aspects, the computing system 300 may include a permissions gateway 320 in which the permission set 325 is included. In addition, the permission set 325 may include one or more consent parameters, such as a parameter 332, a parameter 334, a parameter 336, and a parameter 338, collectively referred to herein as consent parameters 330. Each of the consent parameters 330 may indicate a characteristic for a requesting system, such as the requesting system 270, as described in regards to FIG. 2. A data access request that is received by the permissions gateway 320 may include (or otherwise indicate) one or more characteristics of a requesting system. The permissions gateway 320 may compare the characteristics to one or more of the consent parameters 330.

In some aspects, the permissions gateway 320 may control access to secured data stored in one or more data repositories, such as data repositories 210, as described in regards to FIG. 2. In addition, the permission set 325 may indicate types of access that are allowed for secured data, such as secured data associated with a particular user. The types of access may be based on one or more of the consent parameters 330, including combinations of parameters. For example, the permission set 325 may indicate that a requesting system having characteristics described by the combination of parameter 332 and parameter 334, but without characteristics described by parameter 336, may access the secured data at a high level of detail. Other combination of parameters will be apparent to those of ordinary skill in the art.

In some cases, the permissions gateway 320 may generate one or more of the consent parameters 330, such as an initial set of consent parameters or a consent parameter that is added to the permission set 325. For example, the consent parameters 332, 334, and 336 may be generated based on an initialization command, such as in response to creation of a new user account. The consent parameters 332, 334, and 336 may be generated based on information received by the permissions gateway 320. The information may be provided via a user interface that is presented via one or more computing devices, such as a user interface 355 presented via a user device 350. As a non-limiting example, the particular user associated with the permission set 325 may provide data indicating preferences for the consent parameters 330, such as by answering questions related to each of the consent parameters 332, 334, and 336. In addition, the provided data may indicate a general preference for the permission set 325, such as data indicating a persona selected by the particular user (e.g., a "young parent" persona, an "adventure traveler" persona). The consent parameters 332, 334, and 336 may be generated based on the information provided by the particular user. In some cases, a consent parameter is generated based on a default criteria. As a non-limiting example, a consent parameter may be generated with a default indication to deny access to secured data, based on a legal requirement to obtain a person's permission to access his or her secured data. In some cases, the default criteria may be modified, such as based on information indicating the user's permission to share secured data.

In some cases, an additional consent parameter may be generated and added to an existing permission set. For example, the consent parameter 338 may be generated at a later time than the consent parameters 332, 334, and 336, such as in response to an update command. The consent parameter 338 may be generated based on additional information received by the permissions gateway 320. As a non-limiting example, additional information describing activity of the particular user may be received, such as data indicating a purchase of an automobile. One or more additional consent parameters may be generated based on the additional information, such as consent parameters related to mechanic services.

In addition, one or more of the consent parameters 330 may be modified, such as to indicate a change in an access type for the indicated characteristics. In some cases, the consent parameters 330 may be modified via the user interface 355 presented via the user device 350. For example, the particular user associated with the permission set 325 may provide a modification to one of the consent parameters 330 via the user interface 355, such as an application interface displayed on the user device 350, such as a personal mobile device.

In some cases, one or more of the consent parameters 330 may be generated or modified by the permissions gateway 320 based on an input received via the user interface 355. For example, the permissions gateway 320 may receive, via the user interface 355, an input indicating a selection of a profile. Based on the input indicating the profile selection, the permissions gateway 320 may modify one or more of the consent parameters 330 to indicate an access type for a requesting system associated with the selected profile. As a non-limiting example, based on an input indicating selection of a "young parent" profile, the permissions gateway 320 may modify one or more of the consent parameters 330 to indicate that requesting systems associated with a baby formula company may access the secured data at a high level of detail.

In some cases, one or more of the consent parameters 330 may be generated or modified based on inputs from an additional module or computing system. For example, a modification module 340 may be configured to modify the permission set 325 by generating or modifying one or more of the consent parameters 330. The modification module 340 may determine modifications to the permission set 325 based on, for example, analysis of historical settings of the permission set 325, a comparison to one or more additional permission sets (e.g., associated with additional portions of the secured data), or any other suitable type of analysis. The modification module 340 may, for example, use machine learning algorithms to determine a configuration of consent parameters included in the additional permission sets. In some cases, one or more machine learning modules may perform the machine learning algorithms, such as a machine learning module 345. In addition, the modification module 340 may provide, such as to the permissions gateway 320, a data output indicating the configuration of the additional permission sets. FIG. 3 depicts the modification module 340 as being included in the permissions gateway 320, but other implementations are possible, such as the modification module being included in an additional computing system.

In the computing system 300, the user interface 355 may display information related to the permission set 325, or related to the secured data associated with the particular user for the permission set 325. For example, based on the data output received from the modification module 340, the permissions gateway 320 may provide to the user device 350 information describing a potential modification to the permission set 325. In addition, based on a data access request received from a requesting system that has not requested access at a previous time, the permissions gateway 320 may provide to the user device 350 information describing the requesting system, the data access request, or both. The user interface 355 may provide one or more controls by which the permission set 320 may be modified. For example, the user interface 355 may provide a control by which a new requesting system may be allowed or denied access to the user's secured data.

In some aspects, a permission set, such as the permission set 325, may indicate multiple types of consent parameters by which access to secured data is controlled. For example, types of consent parameters may be categorized by data characteristics, such as anonymized, demographic, PII, or other characteristics of data. Consent parameters may be categorized by characteristics associated with requesting systems, such as organization names, industry, geographic location, customer ratings, or other requestor characteristics. Consent parameters may be categorized by time frames, such as a quantity of access requests, a duration of time, an expiration date, or other time frames. Consent parameters may be categorized by request purpose, such as employment opportunities, medical information, financial services, or other purposes. Consent parameters may be categorized by a communication channel of a user, such as a user who is using a personal mobile device, a home computer, a work computer, or other channels. Consent parameters may be categorized by any other suitable type or category. In addition, the permission set 325 may indicate an access type based on a combination of consent parameters or type of consent parameters. For example, the permission set 325 may be modified to indicate that, for one week, requesting systems associated with car dealerships that are located within 50 km of a particular address may access the secured data at a high level of detail. Other combinations of consent parameters and/or types of consent parameters are possible.

Figure 4:
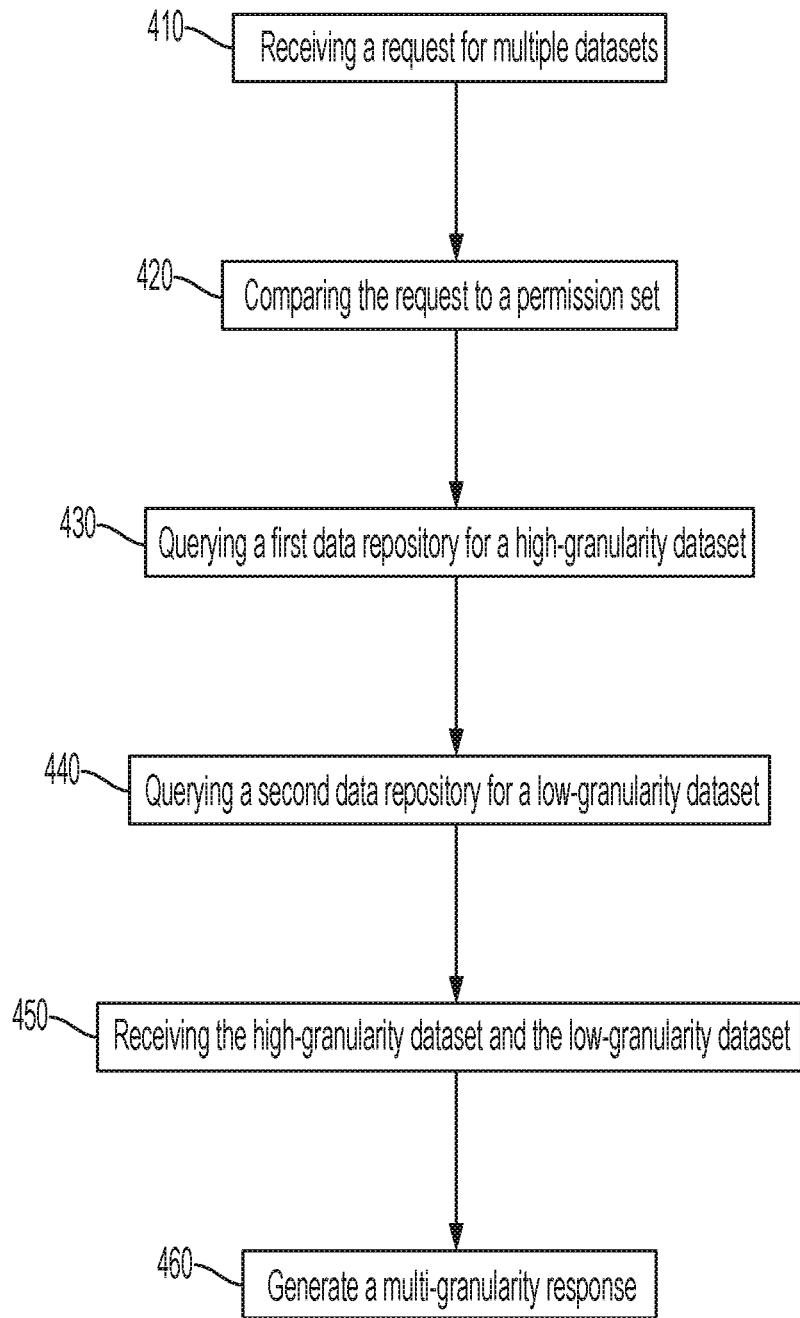
FIG. 4 is a flow chart depicting an example of a process for controlling access to secured data stored on multiple data repositories, according to certain implementations.

FIG. 4 is a flowchart depicting an example of a process for controlling access to secured data stored on multiple data repositories. In some aspects, such as described in regards to FIGS. 1-3, a computing device executing a permissions gateway implements operations described in FIG. 4, by executing suitable program code. For illustrative purposes, the process depicted in FIG. 4 is described with reference to the examples described in FIGS. 1-3. Other configurations, however, are possible.

In block 410, the process depicted in FIG. 4 involves receiving a data access request indicating multiple datasets. The data access request may be received, for example, via a request technique associated with a requesting system, such as requesting system 270. In some aspects, the multiple datasets include secured data, such as secured data that describes a user of a permissions gateway, such as the permissions gateway 220. In addition, each dataset may include high-granularity data. The high granularity data may describe, for example, electronic transactions performed in a computing environment. In some cases, each set of secured data may be stored on a respective one of multiple third-party secured data repositories, such as on data repositories 210.

In block 420, the process depicted in FIG. 4 involves comparing the data access request to a permission set, such as the permission set 225. The permission set may include, for example, one or more consent parameters indicating types of access to the secured data. In some aspects, a first consent parameter may indicate a first access type of the secured data, such as access at a high level of detail. In addition, a second consent parameter may indicate a second access type of the cure data, such as access at a low level of detail. In some cases, the indicated access type is based on a combination of one or more consent parameters. For example, an access type may be based upon the combination of one or more of consent parameters 330.

In block 430, the process depicted in FIG. 4 involves querying a first data repository for a high-granularity dataset. For example, based on the comparison of the data access request to the first consent parameter in the permission set, such as described in regards to block 420, the permissions gateway may generate a first query that requests access to high-granularity data stored on a first data repository of the multiple data repositories.

In block 440, the process depicted in FIG. 4 involves querying a second data repository for a low-granularity dataset. For example, based on the comparison of the data access request to the second consent parameter, such as described in regards to block 420, the permissions gateway may generate a second query that requests access to a low-granularity representation of the high-granularity data stored on a second data repository of the data repositories. In addition, the second query may request access to a summary of the high-granularity data stored on the second data repository. In some aspects, one or more of the first query or the second query are provided via a request technique, such as an API associated with the data repositories.

Although FIG. 4 depicts a configuration in which operations related to block 440 may be performed subsequent to operations related to block 430, other configurations are possible. For example, the second data repository may be queried for the low-granularity dataset prior to querying the first data repository for the high-granularity dataset. In addition, the first and second data repositories may be queried for the high- and low-granularity datasets concurrently, such as by simultaneous execution (e.g., parallel processing) of operations related to blocks 430 and 440, by alternating execution (e.g., multi-thread processing) of operations related to blocks 430 and 440, or by other suitable techniques for concurrent performance of operations.

In block 450, the process depicted in FIG. 4 involves receiving the high-granularity dataset and the low-granularity dataset. For example, the permissions gateway may receive the high-granularity dataset in response to the first query. In addition, the permissions gateway may receive the low-granularity dataset in response to the second query. In some cases, one or more of the high-granularity dataset or the low-granularity dataset are received via a response technique, such as the API associated with the data repositories.

In block 460, the process depicted in FIG. 4 involves generating a multi-granularity response. For example, the permissions gateway may generate the multi-granularity response based on a combination of the high-granularity dataset and the low-granularity dataset. In some aspects, a risk assessment, a recommendation, or both, is included in the multi-granularity response. For example, the permissions gateway, or an associated computing system or module, may determine a multi-granularity risk assessment, or multi-granularity recommendation, based on data included in the high-granularity dataset and the low-granularity dataset. In some cases, the multi-granularity response is provided to another computing system, such as to the requesting system providing the data access request as described in regards to block 410. In addition, the multi-granularity response is provided via a response technique, such as the API associated with the requesting system.

Figure 5:
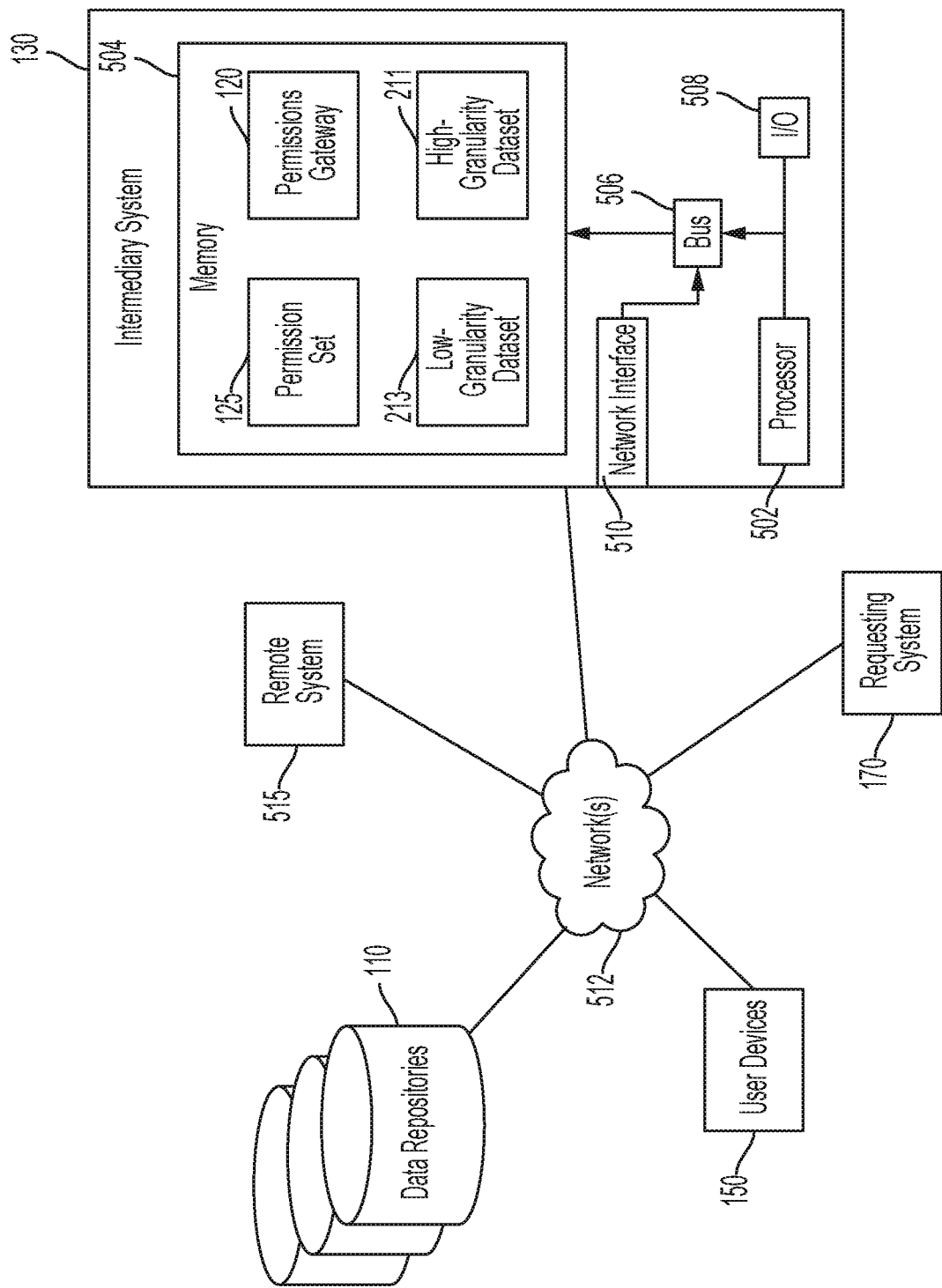
FIG. 5 is a block diagram depicting an example of a computing system configured to implement an intermediary system including a permissions gateway, according to certain implementations.

Any suitable computing system or group of computing systems can be used for performing the operations described herein. For example, FIG. 5 is a block diagram depicting an example of a computing system configured to implement an intermediary system 130, according to certain embodiments.

The depicted example of an intermediary system 130 includes one or more processors 502 communicatively coupled to one or more memory devices 504. The processor 502 executes computer-executable program code or accesses information stored in the memory device 504. Examples of processor 502 include a microprocessor, an application-specific integrated circuit ("ASIC"), a field-programmable gate array ("FPGA"), or other suitable processing device. The processor 502 can include any number of processing devices, including one.

The memory device 504 includes any suitable non-transitory computer-readable medium for storing the permissions gateway 120, the permission set 125, the high-granularity dataset 211, the low-granularity dataset 213, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The intermediary system 130 may also include a number of external or internal devices such as input or output devices. For example, the intermediary system 130 is shown with an input/output ("I/O") interface 508 that can receive input from input devices or provide output to output devices. A bus 506 can also be included in the intermediary system 130. The bus 506 can communicatively couple one or more components of the intermediary system 130.

The intermediary system 130 executes program code that configures the processor 502 to perform one or more of the operations described above with respect to FIGS. 1-4. The program code includes operations related to, for example, one or more of the permissions gateway 120, the permission set 125, the high-granularity dataset 211, the low-granularity dataset 213, or other suitable applications or memory structures that perform one or more operations described herein. The program code may be resident in the memory device 504 or any suitable computer-readable medium and may be executed by the processor 502 or any other suitable processor. In some embodiments, the program code described above, the permissions gateway 120, the permission set 125, the high-granularity dataset 211, and the low-granularity dataset 213 are stored in the memory device 504, as depicted in FIG. 5. In additional or alternative embodiments, one or more of the permissions gateway 120, the permission set 125, the high-granularity dataset 211, the low-granularity dataset 213, and the program code described above are stored in one or more memory devices accessible via a data network, such as a memory device accessible via a cloud service.

The intermediary system 130 depicted in FIG. 5 also includes at least one network interface 510. The network interface 510 includes any device or group of devices suitable for establishing a wired or wireless data connection to one or more data networks 512. Non-limiting examples of the network interface 510 include an Ethernet network adapter, a modem, and/or the like. A remote computing system 515 is connected to the intermediary system 130 via network 512, and remote system 515 may perform some of the operations described herein, such as generating a risk assessment or recommendation, or determining modifications to a permission set. The intermediary system 130 is able to communicate with one or more of the remote computing system 515, the data repositories 110, the user devices 150, or the requesting system 170 using the network interface 510. Although FIG. 5 depicts the remote computing system 515, the data repositories 110, the user devices 150, and the requesting system 170 as connected to intermediary system 130 via the networks 512, other embodiments are possible. For example, functions or operations performed by the remote system 515 may run as a program in the memory 504 of intermediary system 130.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "generating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method that includes one or more processing devices performing operations, the method comprising:
   receiving, from a requesting system, an access request indicating multiple sets of secured data,
   wherein each set of secured data includes high-granularity data describing multiple electronic transactions performed in a computing environment, and
   wherein each set of secured data is stored on a respective secured data repository;
   comparing the access request to a permission set, wherein the permission set includes:
   (i) a first consent parameter indicating a first access type of the secured data, and
   (ii) a second consent parameter indicating a second access type of the secured data;
   providing a first query, based on the comparison, to a first secured data repository for a high-granularity dataset including at least a portion of the high-granularity data stored on the first secured data repository;
   providing a second query, based on the comparison, to a second secured data repository for a low-granularity dataset including a summary of the high-granularity data stored on the second secured data repository;
   receiving, responsive to the first querying of the first secured data repository and the second querying of the second secured data repository, the high-granularity dataset from the first secured data repository and the low-granularity dataset from the second secured data repository;
   generating a multi-granularity risk assessment based on a combination of the high-granularity dataset, the low-granularity dataset, and the permission set, wherein the multi-granularity risk assessment describes risk corresponding to a user associated with the multiple sets of secured data; and
   providing to the requesting system, as a multi-granularity response to the access request, the multi-granularity risk assessment.

2. The method of claim 1, further comprising:
   receiving an input indicating a modification to the first consent parameter;
   receiving an additional access request from the requesting system;
   querying, based on an additional comparison of the additional access request to the modified first consent parameter, the first secured data repository for an additional low-granularity dataset including an additional summary of the high-granularity data stored on the first secured data repository;
   receiving the additional low-granularity dataset from the first secured data repository;
   generating an additional multi-granularity response based on the low-granularity dataset and the additional low-granularity dataset; and
   providing the additional multi-granularity response to the requesting system.

3. The method of claim 2, wherein the modification to the first consent parameter is determined based on at least one of: data received via a user interface, data provided by a machine learning module, or data describing activity of the user associated with the multiple sets of secured data.

4. The method of claim 1, wherein one or more of the first consent parameter or the second consent parameter is based on an input received from a user device.

5. The method of claim 1, wherein the first consent parameter further indicates at least one of: a window of time associated with the first access type, a geographical location associated with the first access type, a communication medium associated with the first access type, or a user preference.

6. The method of claim 1, wherein the multi-granularity response includes a recommendation for a user associated with the permission set.

7. The method of claim 1, wherein the first access type is access at a high level of detail and the second access type is access at a low level of detail.

8. The method of claim 1, further comprising:
   receiving an input indicating a third consent parameter, wherein the third consent parameter indicates the first access type of the secured data;
   modifying the permission set, wherein the modified permission set includes the first consent parameter, the second consent parameter, and the third consent parameter;

receiving an additional access request from the requesting system;
querying, based on an additional comparison of the additional access request to the first consent parameter and the third consent parameter, the first secured data repository for an additional high-granularity dataset including an additional portion of the high-granularity data stored on the first secured data repository;
receiving the additional high-granularity dataset from the first secured data repository;
generating an additional multi-granularity response based on the low-granularity dataset and the additional high-granularity dataset; and
providing the additional multi-granularity response to the requesting system.

9. A system for controlling access to secured data, the system comprising:
a permissions gateway having a local memory device, wherein the permissions gateway is capable of communicating i) with a requesting system via a first access interface and a network and ii) with multiple secured data repositories via at least one second access interface and the network, wherein the permissions gateway is remotely located from the requesting system and the multiple secured data repositories,
wherein the permissions gateway is configured for:
receiving, from the requesting system and via the first access interface, an access request indicating multiple sets of secured data,
wherein each set of secured data includes high-granularity data describing multiple electronic transactions performed in a computing environment, and
wherein each set of secured data is stored on a respective one of the multiple secured data repositories;
comparing the access request to a permission set, wherein the permission set includes:
(i) a first consent parameter indicating a first access type of the secured data, and
(ii) a second consent parameter indicating a second access type of the secured data;
providing, based on the comparison and via the at least one second access interface, a first query to a first secured data repository of the multiple secured data repositories, the first query indicating a request for a high-granularity dataset including at least a portion of the high-granularity data stored on the first secured data repository;
providing, based on the comparison and via the at least one second access interface, a second query to a second secured data repository of the multiple secured data repositories, the second query indicating a request for a low-granularity dataset including a summary of the high-granularity data stored on the second secured data repository;
receiving, responsive to the first querying of the first secured data repository and the second querying of the second secured data repository, the high-granularity dataset from the first secured data repository and the low-granularity dataset from the second secured data repository;
generating a multi-granularity risk assessment based on a combination of the high-granularity dataset, the low-granularity dataset, and the permission set, wherein the multi-granularity risk assessment describes risk corresponding to a user associated with the multiple sets of secured data; and providing to the requesting system, as a multi-granularity response to the access request, the multi-granularity risk assessment.

10. The system of claim 9, the permissions gateway further configured for:
receiving an input indicating a modification to the first consent parameter;
receiving an additional access request from the requesting system;
querying, based on an additional comparison of the additional access request to the modified first consent parameter, the first secured data repository for an additional low-granularity dataset including an additional summary of the high-granularity data stored on the first secured data repository;
receiving the additional low-granularity dataset from the first secured data repository;
generating an additional multi-granularity response based on the low-granularity dataset and the additional low-granularity dataset; and
providing the additional multi-granularity response to the requesting system.

11. The system of claim 10, wherein the modification to the first consent parameter is determined based on at least one of: data received via a user interface, data provided by a machine learning module, or data describing activity of the user associated with the multiple sets of secured data.

12. The system of claim 9, wherein one or more of the first consent parameter or the second consent parameter is based on an input received from a user device, via an additional access interface and the network.

13. The system of claim 9, wherein the first consent parameter further indicates at least one of: a window of time associated with the first access type, a geographical location associated with the first access type, a communication medium associated with the first access type, or a user preference.

14. The system of claim 9, wherein the multi-granularity response includes a recommendation for a user associated with the permission set.

15. The system of claim 9, the permissions gateway further configured for:
receiving an input indicating a third consent parameter, wherein the third consent parameter indicates the first access type of the secured data;
modifying the permission set, wherein the modified permission set includes the first consent parameter, the second consent parameter, and the third consent parameter;
receiving an additional access request from the requesting system;
querying, based on an additional comparison of the additional access request to the first consent parameter and the third consent parameter, the first secured data repository for an additional high-granularity dataset including an additional portion of the high-granularity data stored on the first secured data repository;
receiving the additional high-granularity dataset from the first secured data repository;
generating an additional multi-granularity response based on the low-granularity dataset and the additional high-granularity dataset; and
providing the additional multi-granularity response to the requesting system.

16. The system of claim 9, the permissions gateway further configured for:

generating the multi-granularity response based on data having multiple levels of detail, the multi-granularity response including:
first data having a high level of detail described by the high-granularity dataset, and
second data having a low level of detail described by the summary included in the low-granularity dataset.

17. A non-transitory computer-readable medium embodying program code for controlling access to secured data, the program code comprising instructions which, when executed by a processor, cause the processor to perform operations comprising:
receiving, from a requesting system, an access request indicating multiple sets of secured data,
wherein each set of secured data includes high-granularity data describing multiple electronic transactions performed in a computing environment, and
wherein each set of secured data is stored on a respective secured data repository;
comparing the access request to a permission set, wherein the permission set includes:
(i) a first consent parameter indicating a first access type of the secured data, and
(ii) a second consent parameter indicating a second access type of the secured data;
providing a first query, based on the comparison, to a first secured data repository for a high-granularity dataset including at least a portion of the high-granularity data stored on the first secured data repository;
providing a second query, based on the comparison, to a second secured data repository for a low-granularity dataset including a summary of the high-granularity data stored on the second secured data repository;
receiving, responsive to the first querying of the first secured data repository and the second querying of the second secured data repository, the high-granularity dataset from the first secured data repository and the low-granularity dataset from the second secured data repository;
generating a multi-granularity risk assessment based on a combination of the high-granularity dataset, the low-granularity dataset, and the permission set, wherein the multi-granularity risk assessment describes risk corresponding to a user associated with the multiple sets of secured data; and
providing to the requesting system, as a multi-granularity response to the access request, the multi-granularity risk assessment.

18. The non-transitory computer-readable medium of claim 17, the operations further comprising:
receiving an input indicating a modification to the first consent parameter;
receiving an additional access request from the requesting system;
querying, based on an additional comparison of the additional access request to the modified first consent parameter, the first secured data repository for an additional low-granularity dataset including an additional summary of the high-granularity data stored on the first secured data repository;
receiving the additional low-granularity dataset from the first secured data repository;
generating an additional multi-granularity response based on the low-granularity dataset and the additional low-granularity dataset; and
providing the additional multi-granularity response to the requesting system.

19. The non-transitory computer-readable medium of claim 17, wherein the multi-granularity response includes a recommendation for a user associated with the permission set.

20. The non-transitory computer-readable medium of claim 17, the operations further comprising:
receiving an input indicating a third consent parameter, wherein the third consent parameter indicates the first access type of the secured data;
modifying the permission set, wherein the modified permission set includes the first consent parameter, the second consent parameter, and the third consent parameter;
receiving an additional access request from the requesting system;
querying, based on an additional comparison of the additional access request to the first consent parameter and the third consent parameter, the first secured data repository for an additional high-granularity dataset including an additional portion of the high-granularity data stored on the first secured data repository;
receiving the additional high-granularity dataset from the first secured data repository;
generating an additional multi-granularity response based on the low-granularity dataset and the additional high-granularity dataset; and
providing the additional multi-granularity response to the requesting system.

* * * * *